United States Patent [19]

Vance, Jr. et al.

[11] 4,362,654

[45] Dec. 7, 1982

[54] CHROMIUM-CONTAINING CATALYSTS FOR POLYMERIZING OLEFINS

[75] Inventors: Fred L. Vance, Jr.; Rafael E. Guerra; Christopher P. Christenson, all of Lake Jackson, Tex.

[73] Assignee: The Dow Chemical Company, Midland, Mich.

[21] Appl. No.: 263,642

[22] Filed: May 14, 1981

[51] Int. Cl.$^3$ .................... B01J 21/06; B01J 23/22; B01J 23/26; B01J 23/86

[52] U.S. Cl. .................... 252/469; 252/467; 252/470

[58] Field of Search ............... 252/458, 467, 469, 470; 427/255

[56] References Cited

U.S. PATENT DOCUMENTS

| | | | |
|---|---|---|---|
| 2,825,721 | 3/1958 | Hogan et al. | 260/88.1 |
| 2,846,425 | 4/1958 | Hogan et al. | 260/93.7 |
| 3,013,988 | 12/1961 | Burata et al. | 252/455 Z |
| 3,264,226 | 8/1966 | Johnson | 252/458 X |
| 3,351,623 | 12/1964 | Walker et al. | 260/94.9 |
| 3,752,795 | 8/1973 | Boone | 260/88.2 R |
| 3,923,696 | 12/1975 | Chart et al. | 252/467 |
| 4,041,224 | 8/1977 | Hoff et al. | 526/96 |
| 4,150,208 | 4/1979 | Hwang | 526/96 |
| 4,194,992 | 3/1980 | Corbellini et al. | 252/442 |
| 4,204,050 | 3/1980 | Bressler et al. | 526/97 |
| 4,218,345 | 8/1980 | Hoff et al. | 252/469 X |

FOREIGN PATENT DOCUMENTS 790196 2/1958 United Kingdom .
1500873 2/1978 United Kingdom .

OTHER PUBLICATIONS

Werber; Polymerization of Olefins on Supported Catalysts; (1959) pp. 180–191.

*Primary Examiner*—W. J. Shine
*Attorney, Agent, or Firm*—J. G. Carter

[57] ABSTRACT

Inorganic oxide supported chromium-containing catalysts are improved by depositing the chromium onto the inorganic oxide support in the vapor phase rather than as an inorganic or organic compound. Polymers resulting from polymerizing one or more α-olefins in the presence of such catalysts exhibit a higher molecular weight as compared to those polymers prepared in the presence of such chromium-containing catalysts prepared in the conventional manner.

6 Claims, No Drawings

CHROMIUM-CONTAINING CATALYSTS FOR POLYMERIZING OLEFINS

BACKGROUND OF THE INVENTION

The present invention is directed to supported chromium-containing catalysts, process for their preparation and polymerization of olefins in the presence of such catalysts.

Supported chromium-containing catalysts have been prepared by mixing organic and inorganic compounds of chromium with the support followed by activation in an oxidizing atmosphere at elevated temperatures. Such catalysts when employed in the polymerization of olefins produce polymers of relatively low molecular weight as evidenced by relatively high melt index values.

It has now been discovered that the chromium-containing catalysts of the present invention can be employed in the polymerization of olefins to prepare polymers of relatively high molecular weight as evidenced by relatively low melt index values.

SUMMARY OF THE INVENTION

One aspect of the present invention is an improvement in the preparation of supported chromium catalysts wherein a chromium-containing compound is mixed with the support and activated by heating in an oxidizing atmosphere, the improvement being depositing the chromium onto said support while in the vapor state and a valence state of zero.

Another aspect of the invention is an improvement in the process for polymerizing olefins in the presence of an inorganic oxide supported chromium-containing catalyst wherein the improvement resides in employing as the chromium-containing catalyst one which has been prepared by the vapor deposition of chromium in a zero valence state onto said support.

DESCRIPTION OF THE PREFERRED EMBODIMENTS

In the practice of the present invention, the chromium-containing catalyst can contain only chromium or it can contain other metals such as nickel, zirconium, tungsten, manganese, molybdenum, vanadium, tantalum, titanium, rhenium, ruthenium, rhodium, mixtures thereof and the like.

When catalysts are prepared which contain chromium and other metals, such may be prepared by depositing onto the support material alloys of the metals while in the vapor state or mixtures of pure metals in the vapor state can be employed, or the metals can be deposited separately onto the support while they are in the vapor state.

The support material to be employed in the present invention can be any inorganic oxide such as, for example, the oxides of aluminum, silicon, thorium, zirconium, magnesium, titanium, mixtures thereof and the like.

The chromium and/or other metal can be deposited, while in the vapor state, onto the inorganic support by any suitable means; however, it is preferred to employ a vacuum metal evaporator. By such means, the chromium and/or other metals are heated in an electrical resistance heater or "basket." The metal thus vaporized deposits on the support which is stirred or agitated by other means while in contact with the metal vapor.

The heat activation of the thus prepared catalyst can be conducted in any suitable manner described in the art. Such activation is usually conducted in an oxidizing atmosphere at a temperature of from about 300° C. to about 1000° C., preferably from about 400° C. and about 800° C., usually from about 550° C. to about 750° C. The time required for activation to occur depends usually upon the temperature; however, such times as from about 1 second to 24 hours, preferably from about 1 minute to about 10 hours and most preferably from about 30 minutes to about 6 hours, are suitable.

The chromium-containing catalyst usually contains from about 0.01% to about 10%, preferably from about 0.1% to about 5% and most preferably from about 0.25% to about 1% chromium by weight.

Treatment of the catalyst with a reducing gas before or after the heat activation in an oxidizing gas is not detrimental and may be useful in some instances. Similarly, the catalyst may be treated with other reducing compounds such as metal alkyls or other alkylating agents since the polymerization itself will be conducted in a reducing atmosphere.

Olefins which are suitably homopolymerized or copolymerized in the practice of this invention are generally the aliphatic α-monoolefins and α-diolefins having from 2 to about 18 carbon atoms. Illustratively, such α-olefins can include, for example, ethylene, propylene, butene-1, butadiene, pentene-1, 3-methylbutene-1, 4-methylpentene-1, hexene-1, octene-1, dodecene-1, octadecene-1, 1,7-octadiene, mixtures thereof and the like. It is understood that α-olefins may be copolymerized with one or more other α-olefins and/or with minor amounts, i.e. up to about 25 weight percent based on the polymer, of other polymerizable ethylenically unsaturated monomers such as styrene, α-methylstyrene and similar ethylenically unsaturated monomers which do not destroy the conventional chromium or related catalysts. Most benefits are realized in the polymerization of aliphatic 1-monoolefins, particularly ethylene and mixtures of ethylene with up to about 50, especially from 0.1 to about 40, percent by weight, based on total monomer, of any one or more of propylene, butene-1, hexene-1, octene-1, 4-methylpentene-1, 1,7-octadiene, 1,4-hexadiene, or similar α-olefins or diolefins containing at least one α-olefin.

In the polymerization process of the present invention, the catalyst is added to the polymerization zone or vessel containing α-olefin monomer or vice versa. The polymerization zone is maintained at temperatures in the range from about 0° C. to about 300° C., preferably at polymerization temperatures of from about 120° C. to about 270° C., for a residence time of about a few seconds to about 72 hours, preferably 15 seconds to 2 hours.

It is generally desirable to carry out the polymerization in the absence of moisture and oxygen. A catalytic amount of the catalytic reaction product is generally within the range from about 0.0001 to about 0.1 millimoles chromium per liter of diluent. It is understood, however, that the most advantageous catalyst concentration will depend upon polymerization conditions such as temperature, pressure, solvent and presence of catalyst poisons and that the foregoing range is given to obtain maximum catalyst yields in weight of polymer per unit weight of chromium.

Generally, in the polymerization process, a carrier which may be an inert organic diluent or solvent or excess monomer is employed.

Suitable inert diluents which can be employed in the polymerization and as carriers for the catalysts include, for example, liquified ethane, propane, isobutane, n-butane, n-hexane, the various isomeric hexanes, isooctane, paraffinic mixtures of alkanes having from 6 to 12 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, and especially those having boiling points in the range from about −50° C. to about 200° C.

The polymerization pressures preferably employed are relatively low, e.g., from about 50 to about 1000 psig (344.74 to 6894.8 kPa), especially from about 100 to about 700 psig (689.48 to 4826.36 kPa). However, polymerization within the scope of the present invention can occur at pressures from atmospheric up to 30,000 psi (206844 kPa) or higher as determined by the capabilities of the polymerization equipment. During polymerization it is desirable to stir the polymerization recipe to obtain better temperature control and to maintain uniform polymerization mixtures throughout the polymerization zone.

In order to optimize catalyst yields in the polymerization of ethylene, it is preferable to maintain an ethylene concentration in the solvent in the range of from about 1 to about 99 weight percent, most advantageously from about 10 to about 20 weight percent. To achieve this, when an excess of ethylene is fed into the system, a portion of the ethylene can be vented.

Hydrogen can be employed in the practice of this invention to control the molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The monomer or mixture of monomers is contacted with the catalytic reaction product in any conventional manner, preferably by bringing the catalytic reaction product and monomer together with intimate agitation provided by suitable stirring or other means. Agitation can be continued during polymerization, or in some instances, the polymerization can be allowed to remain unstirred while the polymerization takes place. In the case of more rapid reactions with more active catalysts, means can be provided for refluxing monomer and solvent, if any of the latter is present, in order to remove the heat of reaction. In any event, adequate means should be provided for dissipating the exothermic heat of polymerization. If desired, the monomer can be brought in the vapor phase into contact with the catalytic reaction product, in the presence or absence of liquid material. The polymerization can be effected in the batch manner, or in a continuous manner, such as, for example, by passing the reaction mixture through an elongated reaction tube which is contacted externally with suitable cooling media to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent of the types conventionally employed for deactivating chromium catalysts. The resultant polymer is found to contain insignificant amounts of catalyst residue.

The following examples are given to illustrate the invention, and should not be construed as limiting its scope. All percentages are by weight and all parts are by molar or atomic ratio unless otherwise indicated.

In the following examples, the melt index values $I_2$ and $I_{10}$ were determined by ASTM D 1238-70 and the density values were determined by ASTM D 1248-74.

EXAMPLE 1

A. Preparation of Catalyst (Present Invention)

A 5 gram quantity of Davidson 952 silica was placed in a round bottom flask fitted with a tungsten basket electrical resistive element and a magnetic stirring bar. An approximate 1 gram lump of chromium metal was placed in the tungsten basket. The round bottom flask was then sealed to a high vacuum manifold (vacuum produced by a silicone oil diffusion pump) and the atmosphere was slowly removed from the flask leaving a high vacuum. A Variac power supply was then attached to the external terminals of the tungsten basket and the silica was stirred with a magnetic stirrer. Power was applied through the tungsten basket until the chromium began to vaporize.

Not all of the chromium metal was deposited on the silica; a large amount coated the walls of the flask. The chromium content for the catalyst was determined by a DC argon plasma atomic emission method to be 0.25%.

The gray powder, consisting of the chromium metal deposited on silica, was placed in a Vicor tube containing a coarse fritted quartz disk at one end, and the tube was mounted in a vertical tube furnace. Air, dried by passing through a column of silica gel and a column of molecular sieves, was used to fluidize the grey powder. The temperature was increased to 750° C., and maintained for 5½ hours. The active catalyst was then cooled to room temperature while being fluidized with dry nitrogen. The yellow powdery catalyst was transferred under a dry nitrogen atmosphere and stored in a nitrogen filled dry box.

B. Preparation of Catalyst (Comparative)

A 0.19 gram quantity of $CrO_3$ was dissolved in 65 grams of deionized water and mixed with 40 grams of Davidson 952 silica to give 0.25% Cr. The mixture was dried at 80° C. overnight to remove excess water. The yellow powder was placed in a Vicor tube fit with a coarse fritted quartz disk and mounted vertically in a tube furnace. The powder was fluidized with dry air purified by passing through a column of silica gel and a column of molecular sieves. The temperature was increased to 750° C., and maintained for 5½ hours. The active catalyst was then cooled to room temperature while being fludized with dry nitrogen. The yellow powdery catalyst was transferred under dry nitrogen atmosphere and stored in a nitrogen filled dry box.

C. Polymerization (Present Invention)

A polymerization was conducted in a 5 liter stirred lab batch reactor containing 2 liters of Isopar ® E, an isoparaffinic hydrocarbon fraction having a boiling range of 116°–134° C., which was purified by passing through molecular sieves. The temperature was maintained at 140° C. (which resulted in a 15 psig, 103.422 kPa, solvent vapor pressure), and the reactor was pressurized to a total pressure of 350 psig, 2413.18 kPa, with ethylene purified by flowing through molecular sieves. Ten milliliters of a 0.1 M Isopar ® E solution of triethyl aluminum was syringed into a 75 milliliter pressure bomb under a nitrogen purge. The bomb was then pressured to 450 psig, 3102.66 kPa, with nitrogen and the triethyl aluminum was vented into the reactor. An Isopar ® E slurry (50 milliliters) containing 0.4 grams of catalyst prepared in (A) above was injected into the reactor in the same manner. Ethylene was polymerized for forty-five minutes. The polymer was removed from the reactor and dried in a vacuum oven at 80° C.

The 102 grams of polymer produced had a melt index ($I_2$) of 0.23, a melt index ($I_{10}$) of 4.51, a melt index ratio ($I_{10}/I_2$) of 19.6, a density of 0.9522, and an efficienty of 102,000 grams polymer/gram Cr.

D. Polymerization (Comparative)

A polymerization was conducted as in (C) above using 0.4 grams of catalyst prepared in (B) above.

The 155 grams of recovered polymer had a melt index ($I_2$) of 0.65, a melt index ($I_{10}$) of 11.85, a melt index ratio ($I_{10}/I_2$) of 18.23, a density of 0.9520, and an efficiency of 155,000 grams polymer/gram Cr.

E. Polymerization (Present Invention)

A polymerization was conducted similar to (C) above at 150° C. (25 psig, 172.37 kPa solvent vapor pressure) using 0.4 grams of catalyst prepared in (A) above.

The 77 grams of polymer produced had a melt index ($I_2$) of 0.60, a melt index ($I_{10}$) of 12.73, a melt index ratio ($I_{10}/I_2$) of 21.2, a density of 0.9498, and an efficienty of 77,000 grams polymer/gram Cr.

F. Polymerization (Comparative)

A polymerization was conducted as in (E) above using 0.4 grams of catalyst prepared in (B) above.

The 139 grams of polymer produced had a melt index ($I_2$) of 0.92, a melt index ($I_{10}$) of 17.72, a melt index ratio ($I_{10}/I_2$) of 19.26, a density of 0.9478, and an efficiency of 139,000 rams polymer/gram Cr.

G. Polymerization (Present Invention)

A polymerization was conducted similar to (C) above at 160° C. (30 psig, 206.844 kPa, solvent vapor pressure) using 0.4 grams of catalyst prepared in (A) above.

The 54 grams of polymer produced had a melt index ($I_2$) of 2.57, a melt index ($I_{10}$) of 48.83, a melt index ratio ($I_{10}/I_2$) of 19.0, a density of 0.9461, and an efficiency of 54,000 grams polymer/gram Cr.

H. Polymerization (Comparative)

A polymerization was conducted as in (G) above using 0.4 grams of catalyst prepared in (B) above.

The 123 grams of polymer produced had a melt index ($I_2$) of 4.04, a melt index ($I_{10}$) of 81.58, a melt index ratio ($I_{10}/I_2$) of 20.2, a density of 0.9449, and an efficiency of 123,000 grams polymer/gram Cr.

The result of the above polymerizations are summarized in the following Table.

| EXPERIMENT NUMBER | $I_2$ | $I_{10}$ | $I_{10}/I_2$ | DENSITY |
|---|---|---|---|---|
| 1-C | 0.23 | 4.51 | 19.6 | 0.9522 |
| 1-D* | 0.65 | 11.85 | 18.23 | 0.9520 |
| 1-E | 0.60 | 12.73 | 21.2 | 0.9498 |
| 1-F* | 0.92 | 17.72 | 19.26 | 0.9478 |
| 1-G | 2.57 | 48.83 | 19.0 | 0.9461 |
| 1-H* | 4.04 | 81.58 | 20.2 | 0.9449 |

| EXPERIMENT NUMBER | REACTOR TEMPERATURE | CATALYST EFFICIENCY |
|---|---|---|
| 1-C | 140° C. | $102 \times 10^3$ |
| 1-D* | 140° C. | $155 \times 10^3$ |
| 1-E | 150° C. | $77 \times 10^3$ |
| 1-F* | 150° C. | $139 \times 10^3$ |
| 1-G | 160° C. | $54 \times 10^3$ |
| 1-H* | 160° C. | $123 \times 10^3$ |

*Comparative

From the above Table, it is clearly evident that the catalysts of the present invention (Experiments 1-C, 1-E and 1-G) consistently produce polymers which are higher in molecular weight as evidenced by the lower melt index ($I_2$) values than do the chromium-containing catalysts prepared in the conventional manner (Experiments 1-D, 1-F and 1-H).

We claim:

1. In an inorganic oxide supported chromium-containing catalyst wherein said catalyst has been prepared by contacting said inorganic oxide support with zero valent chromium in the vapor state followed by activation in an oxidizing atmosphere at an elevated temperature for a time sufficient to activate the catalyst.

2. The catalyst of claim 1 wherein the activation in an oxidizing atmosphere is conducted at a temperature of from about 300° C. to about 1000° C. and the chromium content of said supported catalyst is from about 0.01% to about 10% by weight.

3. The catalyst of claim 2 wherein the activation in an oxidizing atmosphere is conducted at a temperature of from about 400° C. to about 800° C. and the chromium content of said supported catalyst is from about 0.1% to about 5% by weight.

4. The catalyst of claim 3 wherein the activation in an oxidizing atmosphere is conducted at a temperature of from about 550° C. to about 750° C. and the chromium content of said supported catalyst is from about 0.25% to about 1% by weight.

5. The catalyst of claims 1, 2, 3 or 4 wherein said chromium is deposited on said support in the vapor phase
  (1) as an alloy with at least one other metal or
  (2) as a mixture with at least one other metal.

6. The catalyst of claim 5 wherein said other metal is nickel, titanium, zirconium, vanadium or mixture thereof.

* * * * *